United States Patent Office 3,592,787
Patented July 13, 1971

3,592,787
URETHANE ELASTOMERS
Janis Robins, St. Paul, Minn., assignor to Minnesota Mining and Manufacturing Company, St. Paul, Minn.
No Drawing. Continuation-in-part of applications Ser. No. 41,153, July 6, 1960, Ser. No. 199,644, June 4, 1962, and Ser. No. 537,015, Mar. 24, 1966. This application Mar. 28, 1969, Ser. No. 811,593
Int. Cl. C08g 22/40
U.S. Cl. 260—18
2 Claims

ABSTRACT OF THE DISCLOSURE

A process is provided for making a cross-linked polyurethane rubber by forming a liquid reaction mixture of a liquid polymeric polyol reactant having dissolved therein a catalytic amount of a mercuric salt of a carboxylic acid containing from 2 to 18 carbon atoms e.g. mercuric octoate, napthenate, stearate or oleate, and an organic polyisocyanate reactant, at least one of these reactants includes a polyfunctional component for cross-linking having more than two functional groups selected from the group consisting of —NCO and —OH radicals. The reactants mentioned above have an approximately stoichiometric equivalence of —NCO and —OH radicals. The mixture is reacted until substantially all the reactive —NCO and —OH groups have interreacted with one another. This interreaction converts the mixture to a solid non-cellular cross-linked polyurethane rubber substantially free of further reactive groups.

This invention is also directed to a composition capable of reaction with a polyisocyanate to effect a rapid cure of the same. This composition comprises a liquid organic polyol having a minor amount of said mercuric salt dissolved therein.

---

This application is a continuation-in-part of my earlier filed copending applications, Ser. No. 41,153, filed July 6, 1960 now abandoned, Ser. No. 199,644, filed June 4, 1962, and Ser. No. 537,015, filed Mar. 24, 1966, now abandoned.

This invention provides a process for making a cross-linked polyurethane rubber by forming a liquid reaction mixture of a liquid polymeric polyol reactant having dissolved therein a catalytic amount of an ionizable organic compound of divalent mercury having no more than one direct carbon to mercury bond, and an organic polyisocyanate reactant, at least one of said reactants including a polyfunctional component for cross-linking having more than two functional groups selected from the group consisting of —NCO and —OH radicals, said reactants having an approximately stoichiometric equivalence of —NCO and —OH radicals, and reacting said mixture until substantially all of the reactive isocyanate groups and hydroxyl groups have interreacted with one another thereby forming a solid, non-cellular, cross-linked polyurethane rubber substantially free from further reactive groups.

The discovery that liquid mixtures of monomeric organic polyisocyanates and polyhydroxy terminated polyols could be made to cure in a single stage to substantially completely reacted stable solid urethane elastomers when reacted in the presence of soluble compounds of certain metals, e.g. tin, antimony, bismuth, arsenic, and, more recently, lead, has opened new avenues for the application and use of urethane rubbers. As these rubbers cure readily from liquid mixtures under ambient conditions without heat or pressure they are freed from many of the processing and application restrictions previously associated with rubber technology. For example, these rubbers can be formed in situ against cloth, leather, paper, ceramics, metal, plastics and other substrates without requiring heat, pressure, or additives to "finish off" the curing of the rubber.

However, the development of these new, solid, i.e., non-cellular, one-shot urethane polymers utilizing previously known soluble metal compound catalysts have been hampered by the extreme sensitivity of the polymer forming reaction to even very small quantities of water, in or in contact with the liquid reaction mixture during curing; thus, the reaction mixture components have had to be maintained in a substantially completely anhydrous state prior to mixing, during mixing and thereafter while curing to assure any uniformity of product. Water competes with the hydroxyl groups for reaction with the isocyanate groups in the reaction mixture and, when the competition is between secondary hydroxyl groups (as is usual) and water, the water-isocyanate reaction is favored. Thus, in place of urethane linkages, an excess of urea or other linkages are formed, with release of carbon dioxide causing bubbling, or otherwise resulting in rubbers having inferior physical properties. Unfortunately, prior known soluble metal catalysts have been found to either indiscriminately promote the water-isocyanate reaction as well as the hydroxyl-isocyanate reaction, or to be inhibited by water.

A moisture content of as little as 1/10 of 1% of the weight of the reaction mixture may have a profound effect on the resulting product. Since moisture can enter the reaction mixture as a residual contaminant of the polyhydroxy containing component of the system, as water of hydration, as water of absorption in a filler, or other additive, or from the humidity of the environment in which the reaction is carried out, or from the surface against which the polymer is to be cast in situ, or from a myriad or other sources, guarding against undue moisture content to assure uniform quality in solid polymer production has been a continuing problem.

While stable bubble-free elastomers are consistently possible utilizing lead compounds of the kind disclosed in application Ser. No. 41,153, supra, e.g. lead salts of carboxylic acids, as catalysts since the lead compounds unlike other prior known catalysts, promote the secondary hydroxyl-isocyanate reaction while having little accelerating effect on the water-isocyanate reaction, the catalytic activity of the lead compounds is inhibited by the presence of water or free acid. Thus, the formation of free acid, or the presence of water, during storage of the polyol component in which the catalyst is usually dissolved before mixing with the polyisocyanate, or in the presence of the reaction mixture, results in the formation of elastomers having unpredictable cure times and final properties.

While the mercuric compounds, particularly the organo-mercuric compounds, appear to catalyze the water-isocyanate reaction as well as the secondary hydroxyl-isocyanate reaction when these reactions are carried out separately, it has been found, surprisingly, that when these reactions are carried competitively in the same mixture in the presence of divalent mercury compounds in accordance with this invention the hydroxyl-isocyanate reaction is promoted apparently to the substantial exclusion of the water-isocyanate reaction and without inhibition of catalytic activity.

It is thus an object of this invention to react liquid mixtures of polyisocyanates and certain types of polymeric polyols in the presence of organic polyol soluble ionizable compounds containing divalent mercury and to thereby inhibit undesirable side reactions with water to a degree not heretofore possible. It is a further object to provide a long term storage stable liquid polyol component for subsequent reaction with a polyisocyanate, which polyol component contains dissolved therein an ionizable compound of divalent mercury. It is another object to provide liquid urethane reaction mixtures wherein the time for completion of the reaction is less temperature dependent, and wherein the time for mixing the reactants is lengthened without lengthening gel time, as compared to prior known "cold curing," i.e. ambient temperature (35° F.–100° F.) and pressure (atmospheric), urethane rubbers which solidify in one stage from a liquid state; it is still a further object to provide liquid reaction mixtures of polymeric polyols and polyisocyanates which display great improvement in their behavior relative to the rate of cure and to the predictability of the properties produced in the solid state under varying temperature and humidity conditions as compared to similar prior art mixtures. Other objects and advantages will appear as the description proceeds.

Organic compounds of divalent mercury useful in the practice of the invention are (1) the soluble mercuric salts of carboxylic acids where both mercury valences are bonded directly to carboxyl oxygens, and (2) ionizable monoorgano-mercuric compounds (which contain only one carbon-to-mercury bond) including soluble mercuric salts of carboxylic acids wherein the non-carbon bonded mercury valence is bonded directly to a carboxyl oxygen. The compounds are preferably halogen free, but should in any event be free from ionizable halogen. Examples of the first group of compounds are mercuric salts of carboxylic acids of intermediate carbon chain lengths, as for example the salts of carboxylic acids from 2 to about 18 carbon atoms, e.g. mercuric acetate, propionate, butyrate, pentanoate, hexoate, heptoate, octate, stearate, palmitate, naphthenate; among these salts, mercuric octoate appears to provide optimum catalysis; salts of aromatic carboxylic acids are also useful.

The second group of compounds, the ionizable monoorgano-mercuric compounds, are a greatly preferred group as these have not only been found to be more effective catalysts in smaller quantities than the mercuric salts, but, perhaps more importantly, these monoorgano-mercuric compounds have been found to perform well as co-catalysts with lead compounds and to more positively inhibit side reactions with water of the reaction mixture as the mixture reacts to form a solid polymer. Among this group are monoorgano-mercuric acetates, borates, benzoates, methacrylates, hydroxides, phthalates, gluconates, salicylates, ocoates, stearates, etc.; the organo substituent may be any open or closed chain organic radical which is inert to isocyanate-active hydrogen reactions, as for example an aryl or alkyl group. Other monoorgano-mercuric compounds which have been found to provide effective catalysis are the organo-mercuric substituted ammonium salts as for example di-(phenyl mercuric) substituted ammonium ($[(\phi Hg)_2NH_2]^+$) phenate, glycolate, ethylene diamine tetra acetate, benzene sulphonate, sulphonate, maleate, etc.

Divalent mercury containing compounds to be useful as catalysts in the practice of this invention should be soluble in the organic polyhydroxy compound in an amount sufficient to catalyze the reaction and enable it to go to completion within a reasonably short time. The amount of the divalent mercury compound necessary to catalyze the reaction mixture is usually extremely small and in the case of monoorganic mercury compounds the solubility can be as little as one part organo-mercuric compound in about 10,000 parts of the polyol to be reacted with the polyisocyanate; in the case of mercuric salts of carboxylic acids the solubility level should be at least about one part catalyst per thousand parts polyol as these latter compounds are not as effective in small quantities to the same degree as the monoorgano-mercuric compounds. Although effective in amounts as small as 0.01% by weight of the polyol, a preferred range under ambient curing conditions for the monoorgano-mercuric compounds has been found to be from about 0.1% to about 1% (as a percentage of the weight of the polyol) utilizing the mercuric salts of carboxylic acids the preferred percentage is from about ½ of 1% to 2%. While greater amounts can be used, they are not necessary.

In the formation of solid rubbers, the NCO— and —OH group containing reactants should be combined to provide approximately equal numbers of these groups, a ratio of about 0.9:1 to about 1.1:1 separate —NCO to —OH respectively being generally adequate to provide reasonable product control. While the reaction mixtures may contain less than equal or excess NCO groups and still provide a stable, solid rubber, when the excess is more than about 20%, or the deficiency more than 10%, control of the rubber properties becomes extremely difficult to maintain since the course of the side reactions provided by the excess NCO— or —OH groups is not entirely predictable. However, in the preparation of saturants or impregnants, etc. a 40% excess of one reactant over the other may be tolerated.

Preferred organic polyisocyanates are the aromatic polyisocyanates ordinarily used in urethane chemistry such as the moderately hindered arylene diisocyanates as for example the toluene diisocyanate isomers. However, unhindered diisocyanates such as 4,4'-biphenylene diisocyanate and extremely, strongly, sterically hindered diisocyanates such as 3,3-dimethoxy, 4,4'-biphenylene diisocyanates, and durene diisocyanate are also useful in the practice of the invention. Triisocyanates, and higher polyisocyanates can also be used; for example, a triisocyanate can be readily formed by the reaction of an excess of toluene diisocyanate with trimethylol propane. Aliphatic polyisocyanates can also be used.

The hardness and the amount of rubberiness in the final elastomeric products may be controlled within relatively close limits by control of the amount of cross-linking. A cross-linked rubber is created by the inclusion of trifunctional or higher polyfunctional components in the reaction system in predetermined amounts, or by building such further functionality into the isocyanate or the polyol sides of the system to provide a functionality greater than two, thereby forming cross-linking sites to form a reticulated polymer structure. Thus, a small amount of a triol or other polyol such as 1,2,6-hexane triol pentaerythritol, trimethylol propane, glycerol, or polymeric compounds having more than two hydroxyl groups per molecule, may be used to initiate the formation of a polyalkylene ether triol. In the polyisocyanate side of the system, a small amount of a triisocyanate or polyisocyanate of greater functionality, such as that provided by the reaction of tolylene diisocyanate with trimethylol propane as mentioned above, or any of the aforementioned polyols of this paragraph can be included. The amount of such further components can be calculated so that the number of crosslinks can be predetermined on the basis of the molecular weight of the final polymer.

The preferred useful polyhydroxy compounds are those acid-free organic polyols having end groups containing activating members valence bonded to carbon atoms which carbon atoms are alpha or beta to carbon atoms carrying primary or secondary hydroxyl groups. Pictorially these end groups may be illustrated as follows:

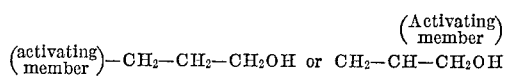

The activating member may be any member selected from the group consisting of OH, S, O, and N. Any remaining valences of the activating members not bonded to the carbon atom of the end group to which the activating member is attached is preferably satisfied by a further carbon atom; however, when a nitrogen activating member forms a part of an amide linkage one of the nitrogen values can be satisfied by hydrogen. It is preferred that such free valences be bonded to a carbon atom wherein the remaining valences of such carbon atom are satisfied by hydrogen, carbon, or by a combination of hydrogen and carbon atoms.

In the event the activating member is attached to the alpha or beta carbon atom by means of a single valence bond, it is preferred that such alpha or beta carbon atom should have at least one hydrogen atom valence bonded thereto in order that the activating member may function best in the practice of the invention.

Examples of useful polyols falling within the foregoing definition are the lower alkylene glycols such as ethylene glycol, propylene glycol, 1,2-, 2,3- and 1,3-butylene glycol, etc. and the polyalkylene ether glycols such as the polyethylene and polypropylene glycols and the higher glycols of the type noted which would provide an activating member alpha or beta to a primary or secondary hydroxyl in the polymer end groups.

Other examples are hydroxyl terminated polyesters made from condensing polycarboxylic acids such as adipic, terephthalic, sebacic, maleic, succinic, etc. with ether glycols such as ethylene glycol or higher alkylene and polyalkylene ether glycols to provide the requisite activating member-containing end groups. Another group of polyols useful in the practice of the invention are the celluloses and cellulosic derivatives. However, for economic reasons and to assure the production of polymers having extremely good water resistance and other desirable properties the polymeric polyalkylene ether glycols form a preferred group of polyols, particularly polypropylene ether glycols having average molecular weights from about 750 to about 4000, and preferably those having molecular weight averages no greater than about 2500.

The invention is further illustrated by the examples following. The polyol and polyisocyanate parts of the mixture are kept separate, of course, before mixing and as a convenience any fillers, pigments, reinforcing agents, etc. desired in the product as well as the catalyst are incorporated into the polyol so that a two-part system is provided with each part being storage stable.

EXAMPLE 1

Liquid reaction mixtures of the urethane composition noted hereinafter were hardened in the presence of various catalysts to illustrate the degree of product control provided by mercury catalysts in the presence of moisture in the reaction mixture as compared with the degree of product control provided by prior known catalysts used to catalyze the hardening of these liquid reaction mixtures to a solid state.

FORMULATION

Part A

| | Percent |
|---|---|
| Polypropylene glycol (2025 molecular wt. average) | 25 |
| Polypropylene glycol (1025 molecular wt. average) | 25 |
| Calcined clay [1] | 50 |

Part B

| | |
|---|---|
| Tolylene diisocyanate (80:20 2,4 and 2,6 isomers) | 90 |
| Trimethylol propane | 10 |

[1] Glomax PVR—Tradename of Georgia Koolin Company, Elizabeth, N.J.

Part A of the formulation was dried by azeotropic distillation with toluene in vacuo to a dryness of less than about 0.05% water as determined by Carl Fisher titration. Part B is anhydrous by nature.

Thereafter Part A was divided into a number of separate portions and in each of these portions a catalyst was dissolved. Then, each portion of Part A was mixed with a portion of Part B with agitation for about 1 minute to provide a liquid reaction mixture and the liquid then poured into a shallow, open pan mold. The parts were combined in each liquid mixture to provide one group of liquid mixtures having an —NCO to —OH ratio of about 1.05:1 and a second group having an —NCO to —OH ratio of about 0.95:1.

After pouring into the pan molds the reaction mixtures were allowed to stand for about 40 hours at normal room temperature (about 70° F.) at a relative humidity of the surrounding atmosphere of about 10%.

These products were compared then with identical products which distinguished therefrom only by the addition of 1/10 of 1% water (by weight) to the Part A of each reaction mixture prior to mixing. The results are shown in the following table.

TABLE I

| | | | Hardness shore A[2] | | | |
|---|---|---|---|---|---|---|
| | | | NCO/OH=1.05 | | NCO/OH=0.95 | |
| Catalyst | Amount [1] | Gel time,[2] min. | Dry (less than 0.05% H₂O) | 0.1% H₂O added | Dry (less than 0.05% H₂O) | 0.1% H₂O added |
| Phenyl mercuric acetate | 0.3 | 5 | 79 | 78 | 66 | 65 |
| Mercuric octoate | 1.0 | 9 | 78 | 76 | 64 | 60 |
| Lead octoate | 0.3 | 11 | 76 | 55 | 62 | 40 |
| Dibutyl tin dilaurate | 2.0 | 15 | 72 | 45 | 60 | 33 |
| Triethylene diamine | 1.0 | 10 | 68 | 40 | 40 | 20 |

[1] As a percent of Part A.  [2] For anhydrous sample.

As will be noted, the lead and phenyl mercuric catalysts were considerably more powerful than the other catalysts, both providing short gel times with very small amounts of catalyst as compared to the other catalysts used.

More significantly, from the table it is clearly apparent that neither the phenyl mercuric acetate catalyzed product nor the mercuric octoate catalyzed product were significantly affected in their final hardness by the addition of water to the reaction system. Yet, all of the other reaction systems to which water was added provided, in the final product, rubbers from 21 to 28 durometer points softer than did the completely anhydrous systems. This tremendous disparity was occasioned by the addition of only 1/10 of 1% water to the polyol part of the reaction mixture. Thus, from the standpoint of the total reaction mixture liquid, less than 1/10 of 1% water had been added. This graphically illustrates the inhibiting effect provided by divalent mercury compounds as catalysts against the incidence of undesirable side reactions of the isocyanate groups in the presence of water.

EXAMPLE 2

Since the lead octoate was found to be the best of the catalyst group against which the mercuric compounds were compared, comparative tests between the phenyl mercuric acetate and the lead octoate were carried out utilizing the following formulations:

Part A

| | Percent |
|---|---|
| Polypropylene glycol (2025 molecular wt. average) | 26.8 |
| Polypropylene glycol (1025 molecular wt. average) | 24.5 |
| Calcined clay (Glomax PVR) | 48.2 |
| Catalyst | 0.5 |

Part B

| | Percent |
|---|---|
| Tolylene diisocyanate (80:20 2,4 and 2,6 isomers) | 90 |
| Trimethylol propane | 10 |

Reaction mixtures of these parts were prepared with ratios of NCO/OH of 1.05:1 and 0.95:1. Prior to mixing, the catalyst was dissolved in Part A. Also, before mixing controlled amounts of water were added to Part A of each reaction mixture so that the effect of this added water could be ascertained upon curing of the reaction mixtures to a solid state. Cures were effected by heating the reaction mixtures to 65° C. for 12 hours and thereafter allowing them to set for one week at room temperatures.

TABLE II

| | Durometer | | | | | | | |
|---|---|---|---|---|---|---|---|---|
| | NCO/OH=1.05 | | | | NCO/OH=0.95 | | | |
| Water added [1] | 0 | 0.1 | 0.2 | 0.3 | 0 | 0.1 | 0.2 | 0.3 |
| Catalyst: | | | | | | | | |
| Phenyl mercuric acetate | 72 | 72 | 70 | 66 | 49 | 49 | 44 | 41 |
| Lead octoate | 71 | 61 | 44 | 14 | 44 | 36 | 22 | 4 |

[1] As percent of Part A.

As is apparent from this table, each tenth percent water added to Part A of each reaction mixture significantly decreased the final hardness of the lead octoate cured rubbers, the difference between 1/10 of 1% water and 2/10 of 1% water resulting in a durometer loss of 10 points in the lead octoate. As the amount of water is increased above 2/10 of 1%, the durometer loss in the lead octoate catalyzed systems becomes so high as to seriously affect the physical properties of the resultant solid. At 3/10 of 1% the cured rubber is seen to have degenerated to a point where it's practically valueless; whereas with the same water additions the phenyl mercuric acetate catalyzed rubber displays a durometer loss, even at 3/10% of only 6 points in the one instance and 8 points in the other.

EXAMPLE 3

This example shows the effects of atmospheric humidity during curing of the liquid reaction mixtures catalyzed with various soluble metal catalysts. The reaction mixtures were all liquid products of the combination of the following two parts:

Part A

| | Percent |
|---|---|
| Polypropylene glycol (2025 average molecular wt.) | 25 |
| Polypropylene glycol (1025 average molecular wt.) | 25 |
| Calcined clay (Glomax PVR) | 50 |

Part B

| | Percent |
|---|---|
| 80:20 2,4- and 2,6-tolylene diisocyanate isomers | 90 |
| Trimethylol propane | 10 |

The reaction mixtures were combined to provide one group with an NCO/OH ratio of 1.1:1 and a second group of 1.05:1.

With reference to the foregoing table, the 65° C. column indicates that the solid product was post cured at 65° C. for 24 hours after the 80 hours at room temperature. In all cases in the foregoing table the NCO/OH ratio was 1.1:1. With the phenyl mercuric acetate, the liquid reaction mixture had solidified to a hard rubber at the end of one hour both under the 20% and the 100% relative humidity conditions, and this hardness remained substantially unchanged throughout the remaining 79 hours at room temperature and subsequent 65° C. post curing cycle, indicating complete reaction of the reactive groups and consequent stability of the hardened product.

On the other hand the lead octoate catalyzed systems, even at a relatively high level of lead octoate to provide an identical gel time to the 3/10 of 1% phenyl mercuric acetate catalyzed system, failed to reach final hardness until the 80 hour period was up to 20% humidity and did not reach this hardness at all under 100% humidity even with a subsequent 65° C. post cure cycle. With other catalysts the results are generally even poorer.

When lesser amounts of the phenyl mercuric acetate and lead octoate were used, the phenyl mercuric acetate still displayed almost complete curing at the end of only 4 hours, achieving a stable hardness which thereafter did not change even after 80 hours and a 24 hour post cure at 65° C. On the other hand, the lead octoate, at the 100% humidity failed to even approach a cure throughout the curing cycle, including the post curing cycle, and even at 20% humidity did not achieve a final hardness of 75 durometer until after 80 hours at room temperature, and 24 more hours at 65° C. Consequently, when it is to be considered that the lead octoate has in the past been considered the preferential catalyst for this kind of a one-shot rubber system, the difference in product consistency with even varying relative humidities becomes quite apparent. The absence of these differences when the mercuric compounds are used as catalysts is startlingly apparent.

EXAMPLE 4

This example shows the superiority of the mercuric compounds as catalysts in rubber formation even through considerable temperature variations.

The formulation of the reaction mixture was as follows:

Part A

| | Percent |
|---|---|
| Polypropylene glycol (2025) | 25 |
| Polypropylene glycol (1025) | 25 |
| Calcined clay (Glomax PVR) | 50 |

Part B

| | Percent |
|---|---|
| 80:20 tolylene diisocyanate | 86.7 |
| Polypropylene oxide extended trimethylol propane (TP 440) to provide an equivalent weight of 142 for each hydroxyl group | 6.0 |
| Trimethylol propane | 7.3 |

TABLE III

| Catalyst | Amount, percent of Part A | Gel time, mins. | Humidity (relative) percent | Shore A₂ hardness | | | | | 65° C. post cure |
|---|---|---|---|---|---|---|---|---|---|
| | | | | Curing time at room temperature for— | | | | | |
| | | | | 1 hr. | 4 hrs. | 12 hrs. | 33 hrs. | 80 hrs. | 24 hrs. |
| Phenyl mercuric acetate | 0.3 | 5.5 | 20 | 75 | 76 | 77 | 79 | 79 | 77 |
| | | | 100 | 74 | 76 | 77 | 76 | 76 | 77 |
| Lead octoate | 0.4 | 5.5 | 20 | 20 | 58 | 67 | 70 | 74 | 78 |
| | | | 100 | 20 | 51 | 61 | 64 | 65 | 65 |
| Phenyl mercuric acetate | 0.2 | 11 | 20 | 70 | 77 | 78 | 79 | 79 | 75 |
| | | | 100 | 70 | 76 | 75 | 75 | 75 | 74 |
| Lead octoate | 0.2 | 15 | 20 | (¹) | 25 | 52 | 60 | 71 | 75 |
| | | | 100 | (²) | 0 | 38 | 49 | 50 | 55 |

¹ Gelled.  ² Liquid.

Parts A and B were mixed with agitation to provide an NCO/OH ratio of about 1.1. At mixing, Part A (which comprises about 90% of the mixture) was at the curing temperature whereas Part B was at about room temperature. Mixing time was approximately one minute and the liquid reaction mixtures were then poured into pre-cooled pan molds, (or preheated where necessary) to the desired curing temperature. In each instance the catalyst had been dissolved in Part A prior to bringing Part A to the mixing and curing temperature.

The results are set forth in the table following:

TABLE IV

| Catalyst | Amount, percent Part A | Gel time, mins. | Hours to reach 60 Dur. (Shore A$_2$) at— | | | |
|---|---|---|---|---|---|---|
| | | | 3° C. | 21° C. | 25° C. | 41° C. |
| Phenyl mercuric acetate | 0.3 | 5.5 | 12 | ½ | ¼ | ⅙ |
| Lead octoate | 0.3 | 4.5 | [1]100 | 6 | 3 | 1 |

[1] Estimated.

As is apparent from the table, over a temperature span of about 40° the curing time spread of the phenyl mercuric acetate catalyzed reaction mixture to achieve a 60 durometer hardness was less than 12 hours whereas the lead octoate catalyzed reaction mixture, even on an estimated basis since cure was not actually achieved, would have required at least 100 hrs. to cure to a 60 durometer state at 3° C. indicating at least about a 99 hour variation in curing time during the 40° temperature span.

EXAMPLE 5

Divalent mercury compound catalyzed reaction mixtures have been found to possess a longer induction period to permit mixing of the reactants in forming the liquid reaction mixture than similar reaction mixtures catalyzed with other soluble metal compounds. The mercury catalyzed systems remain very fluid (low viscosity) during mixing and prior to pouring giving the operator a long period of time to assure uniformity of mixing, followed by very rapid viscosity rise to achieve quick gelation. A more steady rapid viscosity rise of systems catalyzed with other soluble metal compounds appears to occur so that the mixtures thicken more rapidly, thereby allowing shorter mixing and pouring times. As is apparent from the examples preceding, this better and longer mixing ability of the divalent mercury compound catalyzed systems is not gained at the expense of longer gel or curing times inasmuch as the mercury catalyzed systems appear to, in general, cure to their final properties more readily and under a wider range of temperature and humidity conditions than reaction systems catalyzed by other soluble metal compounds.

To illustrate this premise, Part A and Part B of a reaction system were mixed in a ratio of NCO/OH of about 1:1. Each Part A was composed of polypropylene glycol (2025), calcined clay, and catalyst. One Part A contained a lead octoate catalyst, and the other Part A contained a phenyl mercuric hydroxide catalyst. The viscosity of each Part A at 25° C., as measured by a Brookfield viscosimeter, using a number 4 spindle at 30 r.p.m., was between 5600 and 5700 centipoises. Part B was the same as that of the example preceding.

Part A and Part B of each batch was mixed in a machine mixer so that the residence time in the mixer of any given portion of the reaction mixture would be less than 10 seconds; the machine was run under the same conditions for each batch. Thus, the mixing time for each mixture was about 10 seconds. After mixing, the resultant liquid was poured into measuring vessels and viscosity readings taken, the time lapse between mixing and the first viscosity reading being 30 seconds, providing a mixing and pouring time of about 40 seconds. The times in the table following begin with pouring the mixtures into the measuring vessels.

TABLE V

| | Viscosity reading, cps. (Brookfield Viscosimeter #4 spindle, 6 r.p.m.) | | | | | | | Gel time, mins. |
|---|---|---|---|---|---|---|---|---|
| Time in seconds | 0 | 30 | 60 | 90 | 120 | 180 | 210 | |
| Catalyst: | | | | | | | | |
| Phenyl mercuric hydroxide | 3,000 | 3,200 | 3,700 | 4,500 | 6,000 | 13,000 | 21,000 | 15 |
| Lead octoate | 3,000 | 8,000 | 12,000 | 19,000 | 30,000 | 65,000 | | 11 |

As is apparent from the viscosity measurements, the phenyl mercuric hydroxide catalyzed reaction mixture remained at a lower viscosity for a longer period of time than the lead octoate catalyzed reaction mixture. Even more significantly the rise of the phenyl mercuric hydroxide cured reaction mixture was extremely slow for the first 60 seconds, still remaining in the 3,000 centipoise range, whereas the lead octoate catalyzed mixture in the same 60 seconds had progressed from 3,000 to 12,000 centipoises clearly indicating the longer induction time provided by the mercuric catalyzed systems. Even after 210 seconds the mercury compound catalyzed system approximates that of the lead octoate catalyzed system after 90 seconds. However, from the preceding examples, it is clear that this longer period of fluidity is not achieved at the expense of lengthened gel or cure times.

EXAMPLE 6

While the ionizable halogen free divalent mercury compounds, and particularly the monoorganic-mercuric compounds, soluble in polyol to the degree necessary to dissolve them, are valuable to catalyze the formation of rubbers from liquid reaction systems in a single stage, they are also valuable catalysts in the formation of urethane saturants for papers, textiles and other cellulosic materials. These catalysts appear to promote chemical reaction of the isocyanate groups with the cellulose hydroxyl groups, thereby chemically bonding the saturant to the fibers. Three octadecyl isocyanate solutions were prepared for comparison in treating 80 inch by 80 inch cotton swatches. Each solution was a 2% octadecyl isocyanate solution in 1,1,1-trichloroethane, the solutions being designated as follows.

| Solution | Composition |
|---|---|
| A | 2% octadecyl isocyanate. |
| B | 2% octadecyl isocyanate+0.02% triethylamine. |
| C | 2% octadecyl isocyanate+0.02% phenyl mercury octoate |

D ——— 1% $C_8F_{17}SO_2N(C_2H_5)C_2H_4OCONH$— 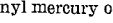 NCO

+0.02% triethylamine.

E ——— 1% $C_8F_{17}SO_2N(C_2H_5)C_2H_4OCONH$—  NCO

+0.02% phenyl mercuric octoate.

The cotton samples were soaked in these solutions and dried at 100° C. for 15 minutes thereafter. Then, the samples were checked for oil and water shedding ability.

TABLE VI

| Sample | Initial | | Five launderings | |
|---|---|---|---|---|
| | Oil | Spray | Oil | Spray |
| A | | 50 | | |
| B | | 50 | | |
| C | | 80 | | |
| D | 100 | 80 | 0 | 0 |
| E | 100 | 80 | 50 | 50 |

Complete repellency is indicated by 100 and lack of any repellency is indicated by the zero rating. As can be seen from the foregoing table the phenyl mercuric octoate catalyzed saturants displayed consistently better oil and spray ratings than the uncatalyzed or the triethylamine catalyzed counterparts.

Evidence that the bond achieved by the phenyl mecuric octoate catalyzed saturant and the cotton was chemical was indicated by acetone extraction. When Sample D was extracted with cold acetone, oil and spray resistance was zero. Whereas when Sample E was extracted with boiling acetone for 3 hours in a Soxhlet extractor, the cloth sample retained an oil rating of 50 to 70.

EXAMPLE 7

The advantage of the monoorgano-mercuric compounds has yet another facet in that the ionizable monoorgano-mercuric compounds act very rapidly as co-catalysts with the lead salts of carboxylic acids in catalyzing the cure to a solid state of liquid reaction mixtures of polyisocyanates and polyols where the reacting hydroxyl groups have an activating member on a carbon alpha or beta thereto. While the monoorganic-mercuric compounds as has been seen from the foregoing examples work very efficiently as catalysts by themselves, these compounds are relatively expensive and it is desirable that they be used in the smallest amounts possible. I have discovered that a synergistic action takes place when organo-mercuric hydroxides and lead salts are used as co-catalysts. Thus, comparing various catalyst systems with the reaction mixture—

Part A

| | Percent |
|---|---|
| Polypropylene glycol (50:50 mixture of 1025 and 2025 molecular weight portions) | 50 |
| Calcined clay | 50 |

Part B

| | |
|---|---|
| 80:20 2,4- and 2,6-tolylene diisocyanate isomers | 90 |
| Trimethylol propane | 10 | wherein the catalysts are dissolved in Part A before mixing with Part B, the synergistic action of co-catalysts are illustrated in the table following:

TABLE VII

| Lead octoate, percent | Phenyl mercuric hydroxide, percent | Gel time, mins.[1] |
|---|---|---|
| 0.3 | | ∞ |
| 0.3 | 0.25 | 4½ |
| | 0.25 | 13 |

[1] Part A (0.3% H₂O).

As is apparent from the table, a much lower concentration of both lead octoate and phenyl mercuric hydroxide can be used when the two are used together as a catalyst than when each is used separately. In fact, the lead salt, when used at the concentration level found useful when used with the monoorganic-mercuric compounds, failed to gel the reaction mixture. Note, the 3/10 of 1% water in the Part A was present as a residue in the polyol formation. Further, when the monoorgano-mercuric compound was used alone at a concentration of only .25%, a gel time of 13 minutes was obtained as contrasted with 4½ minutes when combined with the lead octoate.

This catalytic coaction is also apparent when lead oxide is included with a lead salt and a divalent mercury compound. Thus, utilizing a somewhat similar, but less reactive reaction mixture than that specified in the preceding part of this example, the following results were obtained.

TABLE VIII
[Catalyst, as percent of Part A]

| PbO | Pb(octoate)₂ | φHgOH | φHg acetate | Hg(octoate)₂ | Gel time |
|---|---|---|---|---|---|
| 1.0 | | | | | ∞. |
| 1.0 | 0.3 | | | | >3 hours. |
| 1.0 | 0.3 | 0.25 | | | 7.5 minutes. |
| 1.0 | 0.3 | | 0.35 | | 6.5 minutes. |
| 1.0 | 0.3 | | | 0.25 | 30 minutes. |

The inclusion of the lead oxide is desirable since its presence enhances the storage life of the lead salt when the catalyst is carried as an ingredient of Part A of the reaction system.

EXAMPLE 8

In the preceding examples, formulations have been given wherein the cross-linking of the urethane polymer is provided by a tri-isocyanate, which is formed by reacting a minor portion of trimethylol propane with the TDI (tolylene diisocyanate) in the formation of Part B. It is not necessary that the cross-linking agent be part of the reactive polyisocyanate; it can as well be built into the polyol side of the mixture, or it may be shared by both parts of the system.

A reaction mixture which has the trifunctionality built into Part A is as follows:

Part B

| | Percent |
|---|---|
| Tolylene diisocyanate | 67 |
| Polypropylene glycol, 2025 M.W. average | 17 |
| Tripropylene glycol | 16 |

Part A

| | |
|---|---|
| Polypropylene glycol, 2025 M.W. average | 27 |
| Trimethylol propane extended with propylene oxide | 25 |
| Litharge (lead oxide) | 0.3 |
| Phenyl mercuric acetate | 0.2 |
| Hexogen lead (lead octoate) | 0.1 |
| Clay | 45.4 |
| Pigment, antioxidant, etc. | 2.0 |

Here, the tri-functionality for cross-linking is provided by the polyol side of the mixture. This reaction mixture has a gel time at room temperature of about 5–8 minutes and achieves a substantially complete cure within a matter of a few hours, reaching a stable durometer of about 70–75 Shear A₂ scale. The reaction proceeds even when the reactants are immersed in water without significant harmful effect on the cured product.

EXAMPLE 9

The significance of the presence of the activating members in the hydroxyl carrying end groups was demonstrated by the following procedure:

Reaction mixtures were prepared as solutions in dioxane of different monohydric alcohols with a tolylene diisocyanate and trimethylol propane adduct (10:1 TDI to TMP). To each 100 parts by weight of this solution was added about 1 part catalyst. In all instances, the 10:1 adducts were 80:20 mixtures of 2,4- and 2,6-isomers of tolylene diisocyanate.

In all of the mixtures, the maximum possible heat rise above room temperature for complete reaction was found to be about 34° C., as determined by running very fast reactions with total reaction times of about 10 seconds or less, and averaging out the heat rises. Comparisons with this 34° C. heat use figures of the heat rises noted in the table following give a fair indication of the influence of the actuating members on the catalysis.

TABLE IX

| Catalyst | Heat rise in ° C. after 2 minutes alcohol | | |
|---|---|---|---|
| | $C_2H_5OCH_2CH_2OH$ | $nC_4H_9OH$ | $C_2H_5SCH_2CH_2OH$ |
| None | 0 | 0 | 0 |
| Phenyl mercuric acetate | 29 | 10 | 29 |
| Mercuric naphthenate | 25 | 4 | 30 |

From the table it is apparent, even from these simple rate comparisons, that the activating influence of the catalysts is enhanced by the presence of the activating members adjacent the reactive hydroxyl groups, and that while catalysis is not dependent on their presence, it is enhanced thereby.

Many new and unexpected advantages in urethane rubber formulation have been discovered through the use of divalent mercury catalysts. Rubbers cured from liquid reaction mixtures containing these catalysts have been found to possess tack free surfaces much more rapidly than the rubbers of the prior art; thus, mold separation is less of a problem, dust pick up is reduced and maintenance of clean surfaces facilitated. In curing in open molds, the mercuric catalyzed rubbers have greatly lessened an irritating problem of the prior art in that the build-up of a meniscus of unreacted material around the mold sides at the rubber surface is much less than heretofore observed. A most significant advantage is that mercuric catalyzed urethane rubbers cure in situ against wet concrete, leather and other similar surfaces and firmly adhere thereto; this was not possible with the prior art systems.

EXAMPLE 10

This example illustrates the manufacture of a number of urethane products utilizing various ionizable, halogen-free monoorgano-mercuric compounds as catalysts for urethane product formation. These products were prepared by reacting various polyols and various polyisocyanates with one another in the presence of various monoorgano-mercuric compounds as noted hereinafter. The monoorgano-mercuric compounds used are listed hereinafter:

n-Butyl mercuric acetate
n-Octyl mercuric acetate
Phenyl mercuric acetate
Thiophene mercuric acetate
Thiophene mercuric octoate
Pyridyl mercuric stearate Because of the paucity of monoorgano-mercuric compounds readily commercially available, and the necessity to synthesize them in the laboratory, the group of monoorgano-mercuric compounds was chosen to provide as broad a spectrum of organo substituents as was practical under the circumstances.

Each of these compounds was used to catalyze the reaction at room temperature of a group of reaction mixtures, each such mixture comprising a hydroxyl containing component and an isocyanate containing component. After blending the isocyanate, hydroxyl and the monoorgano-mercuric components of each mixture, the mixture was poured into a flat bottomed shallow pan mold, about ⅛ inch deep, as a liquid reaction mixture. Thereafter the mixture in each mold was allowed to solidify to a solid product at normal room temperature and exposed to the normal room atmosphere, the relative humidity being approximately 20%, and the temperature being approximately 24° C. The reaction mixture of each group distinguished from the other mixtures of the same group only in the particular monoorgano-mercuric compound included therewith. Further, the reaction mixture of each group was duplicated precisely, but with no catalyst, and poured into an identical pan mold, as a control to ascertain whether or not the monoorgano-mercuric compound was providing any catalytic function. All pan molds were left for 24 hours and then demolded where possible. The formulations were compounded to provide an NCO to OH ratio of approximately 1.05, unless otherwise noted hereinafter, and the amount of monoorgano-mercuric compound included in each reaction mixture was that sufficient to provide 0.2% mercury based on the weight of hydroxy containing component. The formulations and the results are set forth hereinafter. Each catalyst was carried in dioxane, some as slurries and others as solutions, with 12.5% mercury present therein. Thus, the grams of catalyst are grams of slurry or solution of catalyst carrying dioxane.

(I)

Ingredients: Amount (gms.)
Polyoxypropylene diol of about 2000 molecular weight _____ 100
Adduct of 86.7% tolylene diisocyanate, 7.3% trimethylol propane and 6.0% polypropylene oxide extended trimethylol propane to a molecular weight of approximately 440 ____ 14.5
Catalyst _____ 1.6

All of the catalyzed products were demoldable after 24 hours to solid, tack free elastomers. The control sample on the other hand was still a liquid in the pan after 24 hours. The durometers of the catalyzed products were as follows.

Catalyst: Shore A₂ durometer
None _____ Liquid
Butyl mercuric acetate _____ 42
n-Octyl mercuric acetate _____ 41
Phenyl mercuric acetate _____ 42
Thiophene mercuric acetate (dissolved in diol by heating preparatory to blending) _____ 34
Thiophene mercuric octoate _____ 40
Pyridyl mercuric stearate _____ 38

(II)

Ingredients: Amount (gms.)
94.3% polyoxypropylene glycol of about 2000 M.W. and 5.7% 4,4'-methylene bis-(ortho chloro aniline) _____ 100
Same isocyanate composition as I _____ 19.4
Catalyst _____ 1.6

In these preparations the ratio of isocyanate to active hydrogen providing groups, i.e. hydroxyl and amine, was 1.05. With each of the five mercuric catalysts a demoldable product was obtained after 24 hours. However, the thiophene mercuric acetate product indicated insufficient catalyst dissolution in the reaction mixture. With no catalyst, a cheesy product incapable of removal from the pan mold without crumbling resulted. The durometer of each product is set forth in the table below.

Catalyst: Shore A₂ durometer
None _____ (1)
Butyl mercuric acetate _____ 53
n-Octyl mercuric acetate _____ 53
Thiophene mercuric acetate _____ 0
Thiophene mercuric octoate _____ 53
Pyridyl mercuric stearate _____ 55

¹ Not measurable, product too soft to demold.

All of the demolded products were solid handleable elastomers; however, the product catalyzed with thiophene mercuric acetate was a soft cheese-like solid not sufficiently hard to measure indicating that while the NCO—OH reaction had been catalyzed, the level of catalysis was not high. The thiophene mercuric acetate was not dissolved in the hydroxyl component by preheating, however, as in I hereof.

(III)

| Ingredient: | Amount (gms.) |
|---|---|
| As II (polyol composition) | 100 |
| Hexamethylene diisocyanate | 12 |
| Catalyst | 1.6 |

As in II preceding, the ratio of NCO to active hydrogens, i.e. both OH and $NH_2$, was 1.05. The non-catalyzed product was a mush in the pan mold after 24 hours. All of the catalyzed products were demolded as solid elastomers denoting significant catalysis, but they were all of fleeting hardness; indicating that the products needed considerable further curing. Thus, while durometer measurements initially showed about 35 to 40 as noted in the table below, the products gradually flowed away from the durometer measuring penetrometer.

| Catalyst: | Shore $A_2$ durometer |
|---|---|
| None | (1) |
| n-Octyl mercuric acetate | 40 |
| Phenyl mercuric acetate | 50 |
| Thiophene mercuric octoate | 33 |
| Pyridyl mercuric stearate | 40 |

[1] Mush, not demoldable.

(IV)

| Ingredient: | Amount (gms.) |
|---|---|
| Diethylene glycol adipate of about 2500 M.W. having an acid number of 1 | 100 |
| As I (isocyanate composition) | 11.2 |
| Catalyst | 1.6 |

The products after 24 hours were as follows. All were demolded except the control.

| Catalyst: | Shore $A_2$ durometer |
|---|---|
| None | Liquid |
| n-Octyl mercuric acetate | 51 |
| Thiophene mercuric acetate | 48 |
| Thiophene mercuric octoate | 51 |
| Pyridyl mercuric stearate | 44 |

All were elastomers except the control composition which remained a liquid.

The pyridyl mercuric stearate was dissolved into the adipate by heating before blending the reactants.

(V)

| Ingredient: | Amount (gms.) |
|---|---|
| Castor oil, urethane grade, acid No. less than 0.5 | 100 |
| 2,4 tolylene diisocyanate | 26.8 |
| Catalyst | 1.6 |

The products after 24 hours were as follows. All were demolded.

| Catalyst: | Shore $A_2$ durometer |
|---|---|
| None | (1) |
| n-Octyl mercuric acetate | 57 |
| Thiophene mercuric acetate | 46 |
| Thiophene mercuric octoate | 57 |
| Phenyl mercuric acetate | 57 |
| Pyridyl mercuric stearate | 56 |

[1] Demoldable products, but too soft to measure.

All were elastomers.

(VI)

| Ingredient: | Amount (gms.) |
|---|---|
| Castor oil, urethane grade | 100 |
| Hexamethylene diisocyanate | 25.7 |
| Catalyst | 1.6 |

The products after 24 hours were all demolded except for the control containing no catalyst, which was still a liquid. The results were as follows.

| Catalyst: | Shore $A_2$ durometer |
|---|---|
| None | Liquid |
| n-Octyl mercuric acetate | 54 |
| Thiophene mercuric acetate | 41 |
| Phenyl mercuric acetate | 56 |
| Thiophene mercuric octoate | 52 |
| Pyridyl mercuric stearate | 53 |

EXAMPLE 11

This example is designed to compare the effect of moisture on the urethane reaction when the mercuric salts of this invention are used as compared to other known catalysts for the urethane reaction. 0.5% by weight of the catalyst in each instance was dissolved (to the extent that it was soluble) in a polyol mixture (Part A) which consisted of equal parts by weight of 2000 molecular weight polyoxypropylene glycol and 1500 molecular weight polyoxypropylene triol. The polyol was warmed to 65° C. in each case to assist in dissolving the catalyst.

A coreactant mixture (Part B) was then prepared which consisted of 66.10 parts by weight toluene diisocyanate and 17.73 parts by weight of 2000 molecular weight polyoxypropylene glycol and 16.17 parts by wt. of tripropylene glycol. The mixture was stirred at 150° F. for 30 minutes, to give an isocyanate-terminated prepolymer with an isocyanate number of about 175.

In each case, 50 parts by weight of Part A was mixed with 13.8 parts by weight of Part B, an NCO:OH ratio of about 1:1. Immediately before mixing of the two coreactive mixtures, 0.2% by weight of water was added to the polyol mixture (Part A) to approximate the amount of adventitious moisture generally present in a reaction mixture due to the addition of fillers, moisture in substrates to which the reaction mixture is applied, or atmospheric moisture.

In each case the coreactants were thoroughly mixed and poured into pan molds for observation. In each case the reaction was allowed to proceed without external heating at room temperature which was 27° C. The Shore $A_2$ durometer hardness at room temperature of each of the specimens was measured from time to time. Mercuric acetate, ferric acetylacetonate, and titanium tetrabutylate, were thus evaluated as catalysts. The results of the hardness measurements thus obtained are given in Table X.

TABLE X

| Catalyst | Shore $A_2$ Durometer hardness at 27° C. | | |
|---|---|---|---|
| | Mercuric acetate | Ferric acetylacetonate | Titanium tetrabutylate |
| Time (hrs.): | | | |
| 0.3 | 10 | Liquid | Liquid. |
| 1 | 23 | ..do.. | Do. |
| 2 | 33 | ..do.. | Liquid w/surface gel. |
| 3.5 | 38 | ..do.. | Do. |
| 5 | 41 | Soft gel | Do. |
| 7 | 44 | ..do.. | Do. |
| 9 | 45 | ..do.. | Do. |
| 14 | 47 | 23 | Do. |
| 24 | 50 | 36 | Do. |
| 48 | 50 | 43 | Do. |

What is claimed is:

1. A process for making a cross-linked polyurethane rubber comprising forming a liquid reaction mixture of a liquid polymeric polyol reactant having dissolved therein a catalytic amount of a mercuric salt of a carboxylic acid containing from 2 to 18 carbon atoms, both mercury valences being directly joined to oxygen atoms of carboxyl groups, and an organic polyisocyanate reactant, at least one of said reactants including a polyfunctional component for cross-linking having more than two functional groups selected from the group consisting of —NCO and —OH radicals, said reactants having an approximate stoichiometric equivalence of —NCO and —OH radicals, reacting said mixture until substantially all of the reactive —NCO groups and —OH groups have interreacted with one another thereby forming a solid, non-cellular, cross-linked polyurethane rubber substantially free from further reactive groups.

2. The process of claim 1 wherein said mercuric compound is selected from the group consisting of mercuric octoate, mercuric naphthenate, mercuric stearate and mercuric oleate.

References Cited

UNITED STATES PATENTS

| | | | |
|---|---|---|---|
| 3,429,855 | 2/1969 | Cobbledick | 260—75X |
| 3,419,509 | 12/1968 | Willett | 260—77.5X |
| 3,395,108 | 7/1968 | Cobbledick | 260—77.5AB |
| 3,136,732 | 6/1964 | Kaestner et al. | 260—33.6 |
| 3,054,755 | 9/1962 | Windemuth et al. | 260—2.5 |

FOREIGN PATENTS

| | | | |
|---|---|---|---|
| 909,358 | 10/1962 | Great Britain | 260—77.5AB |
| 1,212,818 | 3/1960 | France | 260—77.5AB |

OTHER REFERENCES

Journal of Applied Polymer Science, vol. IV, No. 11, pp. 207–211 (1960).

DONALD E. CZAJA, Primary Examiner

C. W. IVY, Assistant Examiner

U.S. Cl. X.R.

106—2; 117—139.5, 143, 154; 161—190; 252——8.6, 431; 260—37, 75, 77.5